Feb. 3, 1959  J. H. COYLE ET AL  2,871,899

TOOL HANDLES

Filed April 16, 1958

INVENTORS,
JOHN H. COYLE,
ARCHIBALD WILSON,
JULIUS L. VARGOVICSIK

BY Paul M. Geist

ATTORNEY.

United States Patent Office 2,871,899
Patented Feb. 3, 1959

2,871,899

TOOL HANDLES

John H. Coyle, Fairfield, Archibald Wilson, Trumbull, and Julius L. Vargovicsik, Fairfield, Conn., assignors to The Bridgeport Hardware Manufacturing Corporation, a corporation of Connecticut Application April 16, 1958, Serial No. 728,999

2 Claims. (Cl. 145—61)

The present invention relates to tool handles, and particularly to a new and improved handle for a tool that is manually subjected to a torque in the manner of an ordinary screw driver and the like.

There is a large class of tools of the above identified type including spinner socket wrenches, augers, hand reamers, taps and special screw drivers such as those used on recessed head screws and which are manipulated by a twisting or rotary motion of the hand about the longitudinal axis of the arm.

A principal object of this invention is to provide a handle for a tool that is manually subjected to a torque in the manner of a screw driver and the like in which substantially increased resultant torsion can be applied with no noticeable increase in the expenditure of effort.

Another object of the invention is to provide a handle for a screw driver and the like in which a rigid body fixed to the shank of the tool has fixed to it an external sleeve of resilient material.

One aspect of the invention may be to provide a handle body fixed to the shank of the tool, and made of a material sufficiently rigid to resist deformation at the connection between the body and shank when subjected to any torsion for which the tool is designed. A relatively soft plastic sleeve may surround the handle body and be joined to it by an adhesive or other means. With such an arrangement it has been found that upwards of fifty percent increase in resulting torque may be effected with no apparent increase in the expenditure of effort. In other words, identical sized screw drivers or the like were used on a torque measuring machine by the same person. One screw driver had the ordinary type of hard handle, and the other had an identical sized handle embodying the principles of the present invention. Without either handle slipping in the hand, and while exerting substantially the same effort, a torque of substantially 150% of that of the hard handled tool registered on the torque measuring device with the resilient sleeve handled tool of this invention.

The above as well as other objects and novel features of the invention will become apparent from the following specification and accompanying drawing, which is merely exemplary.

Figure 1:
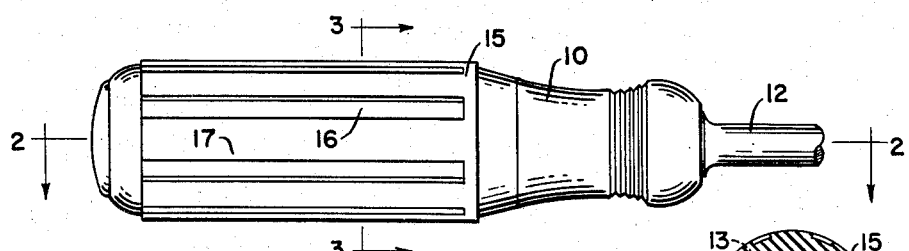
Figure 1 is a view of a tool shank to which the principles of the invention have been applied.

Referring to the drawing, the principles of the invention are shown as applied to a handle of a tool of the class such as screw drivers and the like. A body 10 of substantially cylindrical form may be provided with a longitudinally disposed axial bore 11 into which may be frictionally pressed a shank 12 of the tool. Ribs 13 may be formed on the shank 12 to provide a greater resistance to relative turning between the body 10 and the shank 12 during use.

The material from which the body 10 may be made may comprise any material having the strength and hardness characteristics necessary to permit the transmission of the torque for which the tool is designed to the shank 12 without distorting the material at the connection between the body 10 and the shank 12. Although such materials as wood, metal, hard rubber or the like may be employed, it has been found that cellulose plastic is one material possessing the desired strength and rigidity to satisfy the demands of present-day industry.

Figure 3:
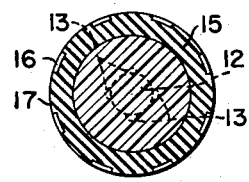
Fig. 3 is a cross-sectional view taken substantially along line 3—3 of Fig. 1.
Figure 2:
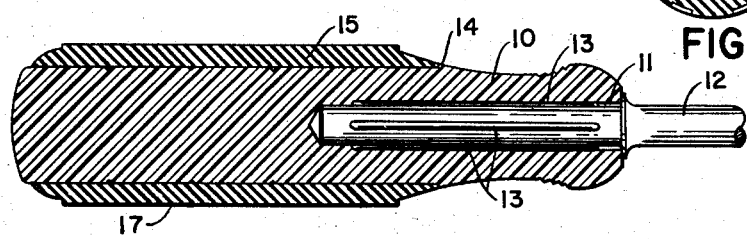
Fig. 2 is a sectional view taken substantially along line 2—2 of Fig. 1.

Referring to Figs. 1, 2 and 3, the handle body 10 may be turned or otherwise formed cylindrically or in any desired form to provide a shoulder 14 near the shank-receiving end of the body. A hand gripping portion for the body 10 may comprise means peripherally surrounding the body 10, and in the embodiment disclosed it is shown as a sleeve 15 having substantially the same inside diameter as the outside turned diameter of the body 10. The sleeve 15 may be forced over the turned portion of the body 10 until its forward end engages the shoulder 14 and its rearward end exposes the rearward end of the body 10.

The material of the sleeve 15 may be substantially softer and more resilient than the material of the body 10. The resiliency of the material for sleeve 15 should be sufficient to effect the transmission of substantially greater torque with the expenditure of substantially the same effort than can be transmitted with a substantially identically designed hard handle tool. It has been found that a resilient rubber-like material having a "Shore A" durometer reading of between substantially 40 and 90 units will produce the desired results of this invention. One such material that has been successfully employed on screw driver handles and the like is a neoprene rubber having a "Shore A" durometer reading of between substantially 55 and 70 units, and having a tensile strength of between substantially 1500 and 2000 pounds per square inch with an elongation of substantially 350 percent.

Screw drivers are invariably used for many purposes other than that for which they are designed. The most common use includes employing the screw driver as a cold chisel wherein it is often hammered. Therefore, the sleeve 15 must expose the end of the hard body 10, otherwise a hammer blow would cause the hammer to fly up into the face of the user.

While in some instances the frictional engagement between the sleeve 15 and the body 10 is adequate to transmit the required torque to shank 12 without slipping between the body and sleeve, the sleeve 15 may be adhesively cemented thereto by an adhesive such as a neoprene base adhesive or the like. One such adhesive is marketed under the trade name "Raybond" and is manufactured by the Raybestos Manhattan Corporation. Other similar types of adhesives will, of course, adequately fix the sleeve 15 to the body 10. Or, the sleeve may be held to the body by intermeshing means on the internal surface of the sleeve and the external surface of the body.

The sleeve 15 may be a molded product and may include various peripheral surface configurations such as, for example, as the longitudinally extending outer circumferentially spaced flutes 16 forming ribs 17 therebetween which, by virtue of the resiliency of the sleeve material in which they are formed, facilitates the production of the results obtained by a handle embodying the principles of this invention.

Figure 4:
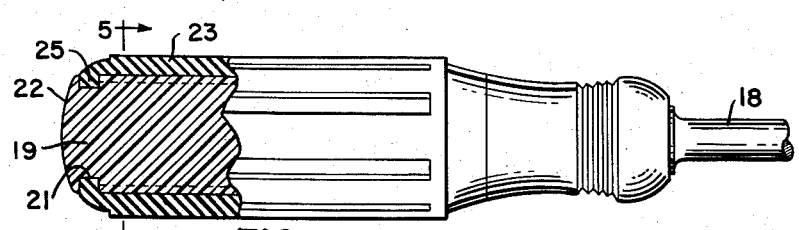
Fig. 4 is a view, partly in section, showing a modified form of the handle shown in Figs. 1, 2 and 3 and to which the principles of the invention have been applied.
Figure 5:
Fig. 5 is a section taken substantially along line 5—5 of Fig. 4.

Referring to Figs. 4 and 5, the principles of the invention are shown as applied to a tool including a shank 18 similar to shank 12 and connected to a hard body 19 similar to body 10. The body 19 may be provided with peripherally spaced longitudinally extending grooves 20, and a circumferential groove 21 spaced slightly inwardly from the rearward exposed end 22 of the body 19. A hand gripping member 23 may be made from the same material as that from which hand gripping member 15 is made. It may include outer peripheral flutes and ribs similar to the flutes and ribs 17 of Fig. 1. It also may include inner peripheral grooves 24 that mate with the ribs formed by the grooves 20 on the body 19. The member 23 may also include an inturned flange 25 that is received within the circumferential groove 21 in the body 19.

From the foregoing it is evident that the mating of the grooves 20 and the ribs formed by the grooves 24 provides a mechanical interlocking or intermeshing connecting means for preventing relative rotary motion between the portion 23 and the body 19 when the tool is subjected to the torque for which it is designed. Furthermore, the cooperation between the inturned flange 25 and the groove 21 also provides a mechanical interlocking connecting means which prevents relative axial movement between the member 23 and the body 19.

Figure 6:
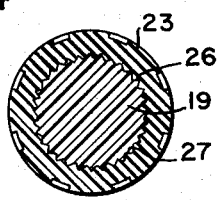
Fig. 6 is a section taken through a handle embodying the principles of the invention, showing a modified form of the means for holding the elastic sleeve to the tool body.

Referring to Fig. 6, the inner periphery of the member 23 is shown as being provided with another form of intermeshing locking means which may comprise axially extending serrations 26 that intermesh with mating axially extending serrations 27 formed on the outer periphery of the body 19.

Although the various features of the new and improved handle for screw drivers and the like have been shown and described in detail to fully disclose several embodiments of the invention, it will be evident that numerous changes may be made in such details, and certain features may be used without others without departing from the principles of the invention.

What is claimed is:

1. In a tool of the type that is manually subjected to a torque in the manner of using an ordinary screw driver, a tool shank; a base having its one end fixed to said shank and made from a material of sufficient rigidity to prevent relative movement between the shank and base when said tool is subjected to a torque for which it is designed; a sleeve of material surrounding said base and extending along said base substantially throughout its entire length and to a point adjacent, but exposing a substantial portion of the end of said base opposite that to which said shank is fixed, said sleeve having a resiliency between substantially 40 and 90 units on the "Shore A" durometer; and intermeshing connecting means between said sleeve and base.

2. In a tool of the type that is manually subjected to a torque in the manner of using an ordinary screw driver, a tool shank; a base having its one end fixed to said shank and made from a material of sufficient rigidity to prevent relative movement between the shank and base when said tool is subjected to a torque for which it is designed; a sleeve of material surrounding said base and extending along said base substantially throughout its entire length and to a point adjacent, but exposing a substantial portion of the end of said base opposite that to which said shank is fixed, said sleeve having a resiliency between substantially 40 and 90 units on the "Shore A" durometer; intermeshing connecting means between said sleeve and base; and means on said sleeve and base interlocking with means on said base for preventing relative axial movement between said sleeve and base.

References Cited in the file of this patent
UNITED STATES PATENTS

| | | |
|---|---|---|
| 1,694,559 | Osgood | Dec. 11, 1928 |
| 2,324,839 | Haumerson | July 20, 1943 |

FOREIGN PATENTS

| | | |
|---|---|---|
| 291,584 | Switzerland | Sept. 16, 1953 |